United States Patent [19]

Richards et al.

[11] 3,894,866

[45] July 15, 1975

[54] PROCESS FOR RECOVERING RHENIUM VALUES FROM DILUTE SOLUTIONS OF SAME

[75] Inventors: Kenneth Julian Richards; Craig Nellis Wright, both of Salt Lake City, Utah

[73] Assignee: Kennecott Copper Corporation, New York, N.Y.

[22] Filed: July 9, 1973

[21] Appl. No.: 377,438

[52] U.S. Cl. .................................... 75/109; 423/50
[51] Int. Cl. ...................... C22b 61/00; C01g 47/00
[58] Field of Search ................... 75/109; 423/49, 50

[56] References Cited
UNITED STATES PATENTS
3,458,277   7/1969   Platzke et al. ........................ 423/49

OTHER PUBLICATIONS

Lebeder, "The Chemistry of Rhenium," Butterworths, London, 1962, pp. 66–72.

*Primary Examiner*—Herbert T. Carter
*Attorney, Agent, or Firm*—Mallinckrodt & Mallinckrodt

[57] ABSTRACT

Rhenium values can be effectively recovered from very dilute solutions thereof, e.g. in the order of from 0.00001 to 0.1 gram of rhenium per liter, as well as from solutions containing up to 1.0 gram of rhenium per liter by precipitation utilizing a base metal precipitant, and by collecting the precipitated rhenium values on a collector metal that is subsequently treated, as by leaching, for recovery of the rhenium. The collector metal can either be in solution along with the rhenium or present in the solution in powdered metallic form. If in solution, it is coprecipitated with the rhenium values. Whether coprecipitated or added to the rhenium solution as a metal powder, such collector metal serves as a carrier to prevent loss of the small quantity of rhenium precipitate that the dilute solution yields.

10 Claims, 2 Drawing Figures

3,894,866

PROCESS FOR RECOVERING RHENIUM VALUES FROM DILUTE SOLUTIONS OF SAME

BACKGROUND OF THE INVENTION

1. Field

This invention is in the field of recovery of rhenium from solutions by precipitation.

2. State of the Art

It is known that rhenium values can be precipitated from solutions containing same by reaction with a base metal precipitant, such as iron or zinc, to form metallic rhenium and a rhenium oxide, see p. 67, "The Chemistry of Rhenium" by K. B. Lebedev. However, when applied to very dilute solutions of rhenium, e.g. 0.1 to 0.00001 gram of rhenium per liter, and even solutions containing up to 1 gram of rhenium per liter, the precipitate particles are so small in size and amounts that recovery thereof is very difficult, if not impossible from a practical standpoint.

SUMMARY OF THE INVENTION

According to the invention, rhenium values are precipitated from very dilute solutions containing as little as 0.00001 to 0.1 gram per liter as well as from dilute solutions containing up to 1.0 gram of rhenium per liter, by reacting such values with a base metal. An additional metal, which can be present and precipitated from the solution along with the rhenium values or added to the solution in particulate form, acts as a collector and traps the extremely small and sparse rhenium precipitate. The additional metal should be present in such quantity as will enable it to be easily separated by conventional methods, from the solution and from any residual precipitant. The particles thereof should have sufficient surface area to trap and carry the precipitated rhenium values. The rhenium values are recovered from the collector metal in any suitable manner, as by leaching under mild oxidizing conditions.

DRAWING

Embodiments representing the best modes presently contemplated of carrying out the invention are illustrated in the accompanying drawing, in which:

FIG. 1 is a flow sheet showing the process applied to a solution containing dissolved rhenium and copper values; and FIG. 2, a similar flow sheet showing the invention applied to a solution containing only dissolved rhenium values.

DETAILED DESCRIPTION OF THE ILLUSTRATED EMBODIMENTS

Figure 1:
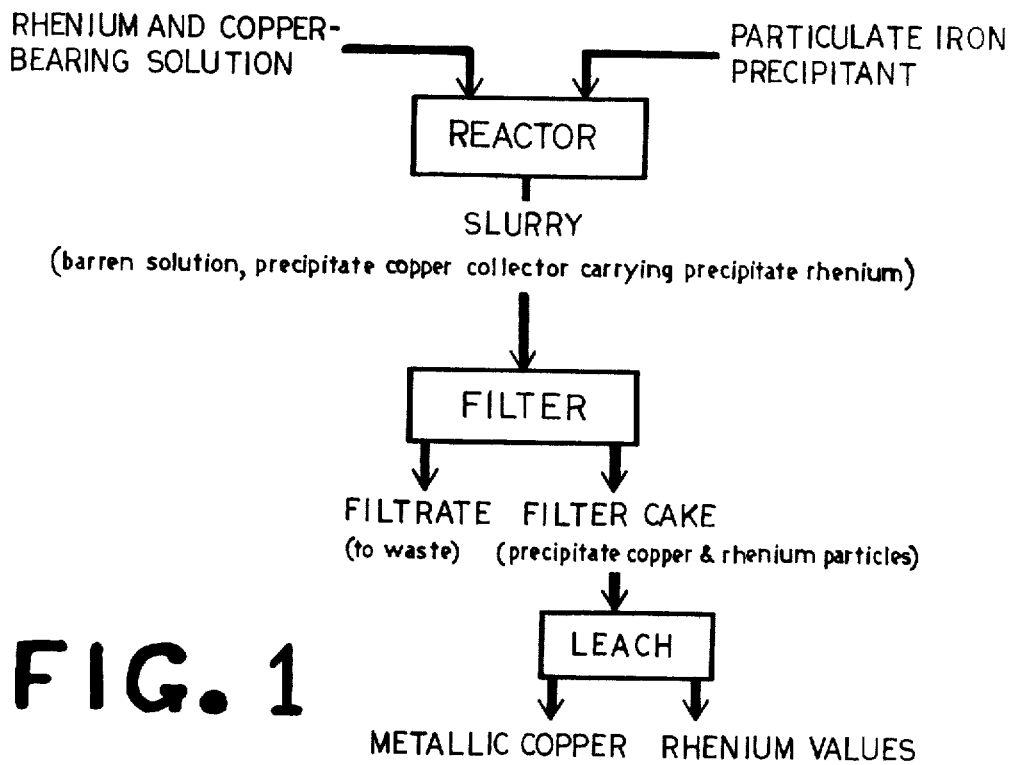
Figure 2:
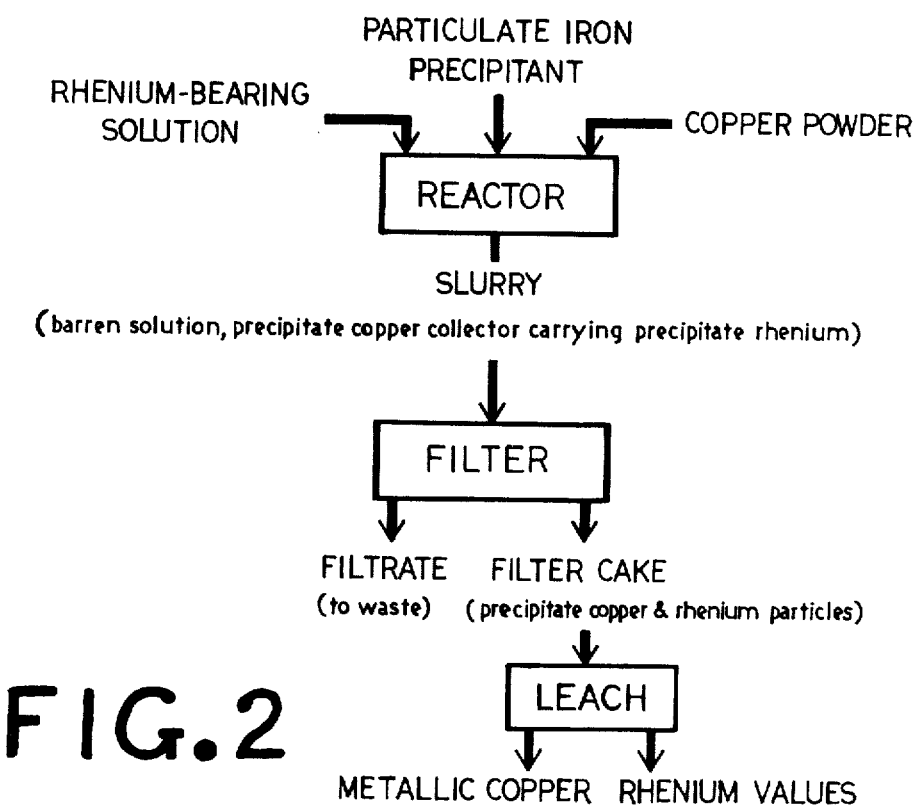

As illustrated in FIG. 1, an aqueous solution containing dissolved rhenium is introduced into a reactor vessel. The solution may be a flue gas scrubbing solution, a raffinate, waste water or leach solutions from processes wherein rhenium is present as a reactant or as a contaminant. A preferred embodiment of the invention provides for recovering the rhenium from a solution obtained by acid leaching of copper mine waste or overburden dumps. Such solutions often contain 0.00001 or more grams of rhenium per liter of solution and from 0.5 to 2 grams of copper per liter of solution.

The rhenium-containing solution is treated in the reactor vessel by contacting it with a base metal selected from the group consisting of aluminum, iron, zinc and other metals more electropositive than copper. The amount of base metal added is not critical and is essentially that required to precipitate the rhenium content of the solution as an insoluble rhenium containing species. In a continuously operating system it is preferred that an excess amount of base metal be present at all times to insure efficient precipitation of the rhenium. Generally, from 1 to 100 grams of base metal per liter of solution will be sufficient depending on the amount of rhenium contained in the solution.

According to the invention, a metal serving as a collector and carrier for precipitated rhenium is present during the precipitation of the rhenium content of the solution. The collector metal can be itself in solution or it can be present in the form of particulate or powdered metal suspended in the solution. In some circumstances, the rhenium containing solution to be treated may already contain some or even a sufficient amount of the collector metal dissolved therein, such as when the solution is recovered from the leaching of copper mine waste or overburden dumps, in which case the solution contains dissolved copper which is satisfactory as the collector metal component of this invention. Simple testing of the solution will establish whether sufficient collector metal component is already dissolved therein or whether the second metal must be added to the solution.

When the collector metal is added to the solution, it can be added either simultaneously with or prior to the addition of the base metal. As mentioned hereinbefore, the collector metal can be present either dissolved in the solution or suspended in the solution as metallic particles. If the collector metal is dissolved in the solution, it is coprecipitated with the rhenium values by the base metal. Applicable collector metals which can be present as dissolved ions capable of coprecipitating with the rhenium include copper, silver and other metals, more electronegative than the base metal. Collector metals which can be added to the solution in particulate or powdered form include copper, silver and any metal more electronegative than the perrhenate or other rhenium species in the solution.

The amount of collector metal contained in or added to the solution is not critical and is essentially that amount having sufficient surface area to collect and entrap the particles of the rhenium precipitate so that the combined rhenium precipitate and collector metal can easily be separated from the solution by simple filtering or other known liquid-solid separating methods. The amount of collector metal component to be added can readily be determined by simple testing with the solution which is to be treated. Usually, it will be preferable to use at least 0.1 gram of the collector metal per liter of the solution. The upper limit of the amount of collector metal is not critical and will normally be determined by economic considerations. Usually no more than 5 grams of collector metal per liter of solution will be required.

The collector-metal component can be added to the solution directly as a finely divided powder or can be added as a compound which is soluble in the solution and which will subsequently coprecipitate with the rhenium containing precipitate during the precipitation step. Desirably, the size of the particles of the collector metal, whether added directly to the solution or precipitated therefrom, is at least 0.01 mm (millimeter) in diameter. Such particles provide adequate surface area for collection of the precipitated rhenium. Particle sizes of between 0.03 mm and 0.3 mm in diameter are preferred. When the collector metal is dissolved in the solution, the amount of base metal added to the solution must be sufficient to precipitate the rhenium and collector metal content of the solution as an insoluble precipitate containing rhenium and the collector metal. When the collector metal is added as a powder and is not dissolved in the solution, the amount of base metal need only be that amount sufficient to precipitate the rhenium content of the solution.

After the base metal and collector metal compound are added to the reactor vessel, the contents of the reactor vessel are contacted for a time sufficient to precipitate the rhenium by cementation on the base metal.

The temperature used in the treatment can vary over a substantial range, preferable within the range of from 20° to 100° C. The pressure is not critical and can be from subatmospheric to superatmospheric. The pH of the solution during the precipitation step can vary between about 0.5 to about 3.5. Preferable the pH will be between 2 and 3.

After the precipitation step, the solids containing the precipitated and collector metal component are separated from the reaction mixture and the rhenium is recovered therefrom. When using iron as the base metal, the reaction mixture containing cemented rhenium can be transferred from the reactor to a magnetic separator where any unreacted iron is removed from the reaction mixture. The recovered iron is then recycled back to the reactor as a portion of the iron used to treat fresh solutions.

The reaction mixture containing the cemented rhenium solids and collector metal component, either coming directly from the reactor or from the magnetic separator in those instances where iron is used as the base metal, is forwarded to a filter or other liquid-solids separation equipment wherein the solids containing precipitated rhenium and collector metal component are separated therefrom. The solution which has been stripped of rhenium-containing solids is discarded or used in other processes not encompassed by the present invention. The rhenium containing solids from the filter or centrifuge are processed by known hydrometallurgical treatments to recover the rhenium therefrom. Such treatments include leaching of the solids under mild oxidizing conditions as well as others disclosed in "The Chemistry of Rhenium" by K. B. Lebedev, Butterworths, London (1962).

The process of the present invention provides substantial improvements in yield and recoverability of the rhenium precipitates in comparison to processes wherein the collector metal component is not utilized. When the collector metal component is not present, the recoverability of the cemented rhenium is severely reduced because the rhenium containing precipitate formed in the absence of the collector metal is extremely small and therefore extremely difficult to recover from the precipitation solution. The particle size of rhenium containing solids precipitated in the presence of suspended particles of the collector metal or coprecipitated with the collector metal component is magnitudes larger than the particle size of rhenium solids precipitated in the absence of the collector metal component. The larger sized particles can be separated from the solution very easily resulting in very high recovery of the precipitated rhenium values. In fact, the process of the present invention approaches essentially total recovery of the precipitated rhenium from the solution.

The following examples will further illustrate the invention:

EXAMPLE 1

To a 500 ml sample of an aqueous rhenium-bearing solution containing 0.15 gram of rhenium per liter of solution and having a pH of 1.15 were added 1.5 grams of powdered iron and 20 grams of powdered copper. The resulting mixture was agitated for 1 hour. The temperature of the reaction mixture was held at 40°C and the pH rose to 1.8.

At the end of the 1 hour period, residual iron was separated from the reaction mixture magnetically and the resulting mixture was centrifuged to recover the rhenium bearing copper powder contained therein. The copper powder contained 83 percent by weight of the rhenium in the original solution.

COMPARISON EXAMPLE

The procedure of Example 1 was repeated with the single exception that powdered copper was not added to the solution. In this example, only 48 percent by weight of the rhenium originally present in the solution was recovered in the solids from the centrifuge.

EXAMPLE 2

To a 1,000 ml sample of an aqueous rhenium-bearing solution containing approximately 0.000033 gram rhenium per liter of solution and 0.5 gram copper per liter of solution and having a pH of 2.3 were added approximately 20 grams of shredded scrap iron. After 5 minutes, the copper concentration of the solution decreased to 0.03 gram per liter and the rhenium concentration decreased to approximately 0.000022 gram per liter. The recovered precipitate contained 20 ppm rhenium which accounted for 91 percent by weight of the rhenium precipitated from the initial solution.

Samples of the precipitate recovered were leached in a 5 percent $Na_2CO_3$ solution saturated with oxygen gas at 80°C. Up to 95 percent by weight of the contained rhenium was selectively dissolved in the leach solution. The leach solution was reused in subsequent leaches and the rhenium content thereof increased to 0.1 gram or more per liter. The resulting relatively concentrated solution was found to be treatable by conventional techniques for production of a high purity $NH_4ReO_4$ salt.

No comparison example was run, because the amount of rhenium involved was too small.

EXAMPLE 3

To five 300 ml samples of aqueous rhenium-bearing solutions containing 0.001 gram of rhenium per liter of solution and 1 gram of copper per liter of solution were added respective quantities of $H_2SO_4$ to provide pHs of 0.6, 1.0, 1.5, 2 and 2.5 respectively.

Each sample had 1.8 grams of powdered zinc added thereto and was then agitated for 1 hour at a temperature of 40°C. Each sample was then centrifuged to remove the solids contained therein. The results are shown in the following table:

Table

| pH of Sample | 0.6 | 1.0 | 1.5 | 2.0 | 2.5 |
|---|---|---|---|---|---|
| % of Rhenium in Original Solution Recovered in Solids | 14–16 | 24–28 | 66–77 | 97–100 | essentially 100 |

COMPARISON EXAMPLE

The procedure of Example 3 was repeated with the single exception that the original samples of aqueous rhenium-bearing solution did not contain any appreciable copper ion (less than 0.1 gram of copper ion per liter of solution). With each of the samples, the precipitate formed, if any, during the 1 hour agitation period was much too fine to be recovered from the mother liquor by filtering or centrifuging. Essentially no solids were obtained and 100 percent of the rhenium contained in the original solution remained in the filtrate from the centrifuge.

Whereas this invention has been illustrated and described with respect to certain preferred embodiments thereof, it is to be understood that many variations are possible without departing from the inventive concepts particularly pointed out in the following claims.

We claim:

1. A process of recovering rhenium values from dilute solutions containing from 0.00001 to 1.0 gram per liter of rhenium, comprising adding particles of a base metal which is more electropositive than copper to such a solution to react with and to precipitate the dissolved rhenium values therein; introducing into the solution, simultaneously with or prior to the addition of said base metal thereto, particles of a collector metal selected from the group consisting of copper and silver to collect the precipitated rhenium values, said particles of the collector metal having sufficient surface area to retain and carry the precipitated rhenium values; separating the solids and the liquids; and treating said solids to recover the rhenium values therefrom.

2. A process in accordance with claim 1, wherein the dilute solution also contains dissolved values of the collector metal; and the particles of the collector metal are introduced into the solution by coprecipitation with the rhenium values.

3. A process in accordance with claim 1, wherein the particles of the collector metal are introduced into the solution by direct addition to the solution as metal particles.

4. A process in accordance with claim 1, wherein the collector metal is copper.

5. A process in accordance with claim 4, wherein the concentration of copper is at least 0.1 gram per liter.

6. A process in accordance with claim 5, wherein the concentration of copper is in the range of 0.1 to 5 grams per liter.

7. A process in accordance with claim 1, wherein the concentration of rhenium in the dilute solution to be treated is from 0.00001 gram per liter to 0.1 gram per liter.

8. A process in accordance with claim 1, wherein the base metal is selected from the group consisting of iron and zinc.

9. A process in accordance with claim 8, wherein the collector metal is copper.

10. A process in accordance with claim 9, wherein the concentration of copper is in the range of from 0.1 to 5 grams per liter.

* * * * *